(12) United States Patent
Radulescu et al.

(10) Patent No.: US 7,017,634 B2
(45) Date of Patent: Mar. 28, 2006

(54) TIRE TREAD INCLUDING HOLLOWED ZONES

(75) Inventors: Robert Radulescu, Perignat-les-Sarlieve (FR); Eric De Benedittis, Saint-Beauzire (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 243 days.

(21) Appl. No.: 10/430,277

(22) Filed: May 7, 2003

(65) Prior Publication Data

US 2003/0201048 A1 Oct. 30, 2003

Related U.S. Application Data

(63) Continuation of application No. PCT/EP01/13118, filed on Nov. 13, 2001.

(30) Foreign Application Priority Data

Nov. 13, 2000 (FR) .................................. 00 14676

(51) Int. Cl.
*B60C 11/12* (2006.01)

(52) U.S. Cl. ............................ 152/209.21; 152/209.23; 152/DIG. 3

(58) Field of Classification Search ............ 152/209.18, 152/209.21, 209.23, DIG. 3
See application file for complete search history.

(56) References Cited

U.S. PATENT DOCUMENTS

| | | | |
|---|---|---|---|
| 2,121,955 A | 6/1938 | Eger | |
| 5,783,002 A | 7/1998 | Lagnier | |
| 5,873,399 A * | 2/1999 | Ochi et al. | 152/DIG. 3 |
| 6,116,310 A * | 9/2000 | Shinohara | 152/DIG. 3 |
| 6,315,018 B1 * | 11/2001 | Watanabe | 152/DIG. 3 |
| 6,408,910 B1 | 6/2002 | Lagnier et al. | |

FOREIGN PATENT DOCUMENTS

| | | | |
|---|---|---|---|
| EP | 0 911 187 A1 | | 4/1999 |
| FR | 2 763 892 | | 12/1998 |
| JP | 2-197402 | * | 8/1990 |
| JP | 2-310108 | * | 12/1990 |
| JP | 4-353432 | * | 12/1992 |
| JP | 07172111 | | 11/1995 |
| JP | 8-197915 | * | 8/1996 |

* cited by examiner

*Primary Examiner*—Steven D. Maki
(74) *Attorney, Agent, or Firm*—Buchanan Ingersoll PC

(57) ABSTRACT

A tread (1) provided with a plurality of cutouts (5, 6, 71, 72, 73, 81, 82, 83) of essentially transverse orientation and characterized in that:
when new, some of the transverse cutouts (5, 6) form on the running surface hollowed zones of average width Lt greater than or equal to 2 mm and of maximum depth Pt at most equal to 80% of the thickness Pb of tread to become worn, the other transverse cutouts (71, 72, 73, 81, 82, 83) forming on the same running surface incisions (71', 72', 73', 81', 82', 83') of average width Li less than 2 mm and of depth Pi at most equal to Pt;
a plurality of the incisions (71', 72', 73', 81', 82', 83') extending by hollowed zones (71", 72", 73", 81", 82", 83") such that after homogenous wear of the tread the volume V1 of the hollowed zones (71", 72", 73", 81", 82", 83") opening on to the new running surface is between 50% and 150% of the volume V0 formed by the hollowed zones when new.

A molding element comprising thick parts and thin parts.

6 Claims, 3 Drawing Sheets coupe selon V-V coupe selon VI - VI

TIRE TREAD INCLUDING HOLLOWED ZONES

This application is a continuation PCT/EP01/13118, filed on Nov. 13, 2001.

BACKGROUND

The invention relates to treads for tires and in particular to the tread patterns of such treads; it also relates to a molding element intended to be fitted on a mould for molding such treads.

In known manner, a tire intended to be fitted on a heavy vehicle comprises a carcass reinforcement surmounted radially to the outside by a crown reinforcement which in turn is surmounted by a tread, the surface radially to the outside of which constitutes the running surface of the tire and is intended to come into contact with the roadway during travel of this tire. To meet the demands in terms of grip and evacuation of water during travel on a wet road, it is known to provide the tread with a plurality of grooves of essentially longitudinal (or circumferential) and transverse (that is to say forming an average angle other than zero with the longitudinal direction) orientation; these grooves define tread pattern elements (ribs, blocks) having an upper face radially to the outside forming part of the running surface of the tread and lateral faces limiting said grooves.

For certain types of tires for heavy vehicles and in particular those intended for use on snow-covered ground, it is necessary to increase the performance in terms of grip and drivability of said tires, whatever their level of wear in order to retain for as long as possible the initial performances of said tires. To increase the grip of a tire, it is known to make at least one incision (that is to say a cutout of width less than or equal to 2 mm and not really creating a hollow volume in the tread) on a plurality of tread pattern elements; the greater the number of incisions and the greater the number of ridges formed on the tread, the more the grip performance is improved. In order to retain for as long as possible the grip performance of the tread as it becomes worn, it is indispensable to provide incisions which are of depths equal to or very close to the depth of the longitudinal grooves (the latter depth being able to define the useful thickness of the tread from the point of view of the quantity of rubber to become worn). This embodiment is unfortunately incompatible with obtaining tread pattern elements having satisfactory rigidity (mainly under the stresses in the contact with the roadway) and may even, under some conditions of travel, result in rubber being torn off the tread (fragility of the rubber slices of low thickness).

An intermediate solution was proposed and marketed by the Applicant (under the name XDN), consisting of producing, in the tread pattern blocks, incisions extending from the running surface when new to a depth substantially equal to half the thickness of said tread. Of course, although this tread pattern permits satisfactory performance when new and until the tread is half-worn, it does not make it possible to maintain this performance for the entire potential period of use of the tire (that is to say until complete wear of the tread has occurred) since the ridges formed by the incisions disappear once wear substantially equal to half the thickness of the tread has occurred.

In the U.S. Pat. No. 6,408,910 it is disclosed a tread for a tire having a sculpture which comprises incisions opening on the rolling surface when new and prolonged towards the inside a the tread by a channel intended to become a new groove after partial wear.

OBJECTS AND SUMMARY OF INVENTION

One object of the present invention is to propose a tread, the tread pattern of which makes it possible to achieve a significant improvement in the grip performance for the entire period of use of the tire, obtaining while an average rate of wear of the tread (average loss of thickness of tread during travel) which is greater than the average rate of the tires provided with incisions extending to half the depth.

Hereafter, the term "cutout" may designate either a groove of average width greater than or equal to 2 mm or an incision of average width less than 2 mm; in both cases, a cutout may open into at least one other cutout, or not open out ("blind" cutout), or open only into one cutout ("obstructed" cutout).

This object is achieved with a tread intended for a tire comprising a carcass reinforcement surmounted radially to the outside by a crown reinforcement which in turn is surmounted by this rubber tread, the surface radially to the outside of which constitutes the running surface of the tire for coming into contact with the roadway during travel of the tire. The tread has a maximum thickness Pb which may become worn during travel and is provided with a plurality of cutouts of essentially transverse orientation.

The tread according to the invention is characterized in that:
when new, some of the transverse cutouts form on the running surface hollowed zones of average width Lt greater than or equal to 2 mm and of maximum depth Pt at least equal to 30% of the thickness Pb of tread to become worn and at most equal to 80% of the same thickness Pb, the other transverse cutouts forming on the same running surface incisions of average width Li' less than 2 mm and of depth Pi of between 30% and 80% of Pt;
when new, all the hollowed zones opening on to the running surface constitute a total hollow volume V0 at least equal to 10% of the volume of the tread to become worn;
a plurality of the incisions extended, starting from the depth Pi, by hollowed zones of average width Li" greater than or equal to 2 mm such that after homogenous wear of the tread substantially equal to a thickness corresponding to the depth Pt of the hollowed zones opening on to the running surface of the tread when new, the volume V1 of the hollowed zones opening on to the new running surface is between 50% and 150% of the initial volume V0.

Advantageously the volume V1 is at least equal to the volume V0 and between 100% and 150% of the initial volume V0.

Preferably, the tread pattern of a tire according to the invention furthermore comprises grooves of circumferential orientation of average depth Pc to facilitate drainage of the water in the case of travelling on a roadway covered with water and to improve the transverse grip. The volume V0 of the hollowed zones is calculated by integrating the volume of the longitudinal grooves with the volume of the transverse grooves. The depth Pc corresponds substantially to the thickness Pb of the tread to become worn during travel.

"Thickness Pb of tread to become used" is understood to mean the limit of wear of said tread, from which point onwards it is desirable to renew this tread, for example, by a recapping process.

The tire according to the invention makes it possible to have performances when new comparable to those of a tire provided with a plurality of ridges which come into contact with the roadway while having a great evacuation capacity (and "storage" capacity by means of the reservoir function of the hollowed zones) owing to the presence of the grooves of longitudinal orientation and to the presence of a plurality of hollowed zones of transverse orientation which have the essential characteristic of not closing up when in contact with the roadway. These performances are obtained while maintaining for the tread a rigidity greater than that which would exist with the same cutouts but of the same depth as the longitudinal grooves.

Furthermore, these good performances are maintained for a major part of the possible period of use corresponding to maximum wear of the tread since after partial wear (that is to say wear partially affecting the tread in its thickness) new hollowed zones open on to the new running surface to become active in the contact of the tire with the roadway.

Advantageously, the incisions are defined by main walls comprising means for effecting mechanical locking of one wall on the other; to this end, the walls may be of zigzag or undulating shape or have reliefs intended for effecting mechanical locking of said walls against one another upon loading of the tread in order to prevent substantial reduction of the rigidity of this tread; such cutouts are described in particular in U.S. Pat. No. 5,783,002.

Preferably, a tread according to the invention comprises at least one rib provided with a plurality of cutouts, each cutout, viewed on the running surface when new, having:

- at least one first part of width greater than or equal to 2 mm and of depth Pt of between 30% and 80% of the total depth of said cutout, said part forming a hollowed zone being extended into the thickness of the tread by at least one part of width less than 2 mm forming an incision,
- at least one second part of width less than 2 mm and of depth of between 30% and 80% of the total depth of said cutout, this second part forming an incision and being in the axial extension of the first part, this second part being extended into the thickness of the tread by at least one part of width greater than or equal to 2 mm to form a new hollowed zone,
- all the hollowed zones opening on to the running surface constitute a total hollow volume at least equal to 10% of the volume of the tread to become worn.

this tread being characterized in that after homogenous wear equal to or greater than the depth of the first part, the total volume of the hollowed zones opening on to the running surface is between 80% and 150% of the total initial volume of the hollowed zones opening on to the running surface when new.

Another object of the invention is to propose a molding element intended to be fitted on a mould for molding a tread according to the invention.

The molding element according to the invention comprises a first and a second region, the first region being intended to be anchored in a tire mould comprising a molding surface and the second region being located in the extension of the first region so as to protrude from the molding surface of a mould for molding a cutout in a rubber tread. The molding element is characterized in that the second region is formed of a plurality of thin parts of average thickness less than 2 mm and of a plurality of thick parts of average thickness greater than or equal to 2 mm, at least one thin part being extended in two distinct directions by thick parts. Preferably, the distinct directions are perpendicular to each other, one of them possibly corresponding to the direction perpendicular to the running surface of the tread to be molded.

In the case of a mould comprising a very large number of molding elements, it is judicious to provide for the thick parts to have a thickness at least equal to twice the thickness of the thin parts (in order to obtain an appreciable technical effect) and at most equal to ten times the thickness of the thin parts (in order to permit easy demoulding).

Advantageously the surfaces of the thin parts of the molding element have geometries suitable for creating meshing of the walls of the incisions; it is also advantageous to provide for a roughness other than zero in order to limit the relative movements of said walls.

BRIEF DESCRIPTION OF DRAWINGS

Other characteristics and advantages of the invention will become apparent from the description given hereafter with reference to the appended drawings, which show, by way of non-limitative examples, forms of embodiment of the subject of the invention.

DETAILED DESCRIPTION OF PREFERRED EMBODIMENTS

Figure 1:
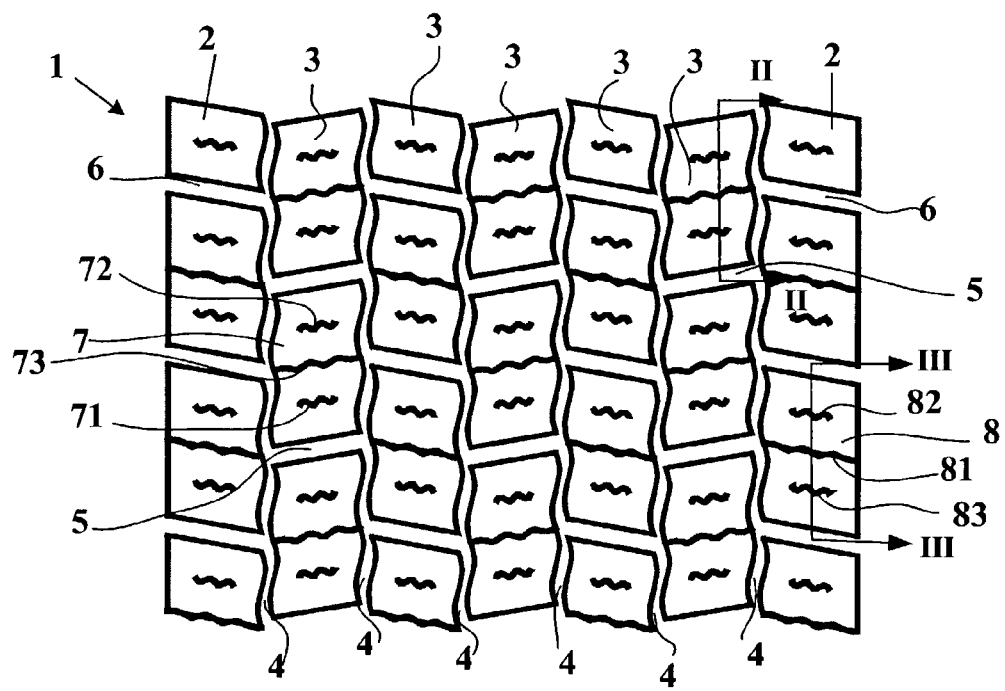
FIG. 1: plan view of a tread in accordance with a first variant.

FIG. 1 shows in a plan view the running surface of a tread 1 of a tire of dimension 315/80 R 22.5 when new. The tread 1 according to this first variant comprises seven circumferential rows of blocks which are defined by grooves of longitudinal 4 (circumferential on the tire) and transverse 5, 6 main orientation; the blocks 2 of the row edges of the tread have a configuration which is different from the blocks of the five central rows.

The grooves of longitudinal main orientation 4 have an average width equal to 5 mm and a maximum depth equal to 23 mm.

The transverse grooves 5 separating the blocks 3 of the central rows have a depth equal to 19 mm and an average width equal to 8 mm at the surface of the tread when new, this length being reduced gradually to 4 mm towards the bottom of said grooves 5. The average distance between two successive transverse grooves 5 is equal to 52 mm.

The five central rows are similar to each other except for the circumferential offset used to reduce the travelling noise emitted by this tread pattern.

Each of the blocks 3 of the five central rows comprises three cutouts 71, 72, 73 opening on to the running surface 7 when new; these three cutouts have depths respectively H1, H2, H3 equal in the present case to the depth Pb of tread to become worn (Pb=30 mm). A first cutout 71 divides each block 3 into two substantially equal parts and opens on to the running surface 7 and into the two longitudinal grooves 4 adjoining said block 3. On either side of this first cutout 71, there are provided two other cutouts 72, 73 opening solely onto the running surface 7 when new and not into the longitudinal grooves. The total depths of these cutouts 71, 72, 73 are greater than the depth Pt of the longitudinal grooves 4 and in the present case they are equal to 30 mm.

Figure 2:
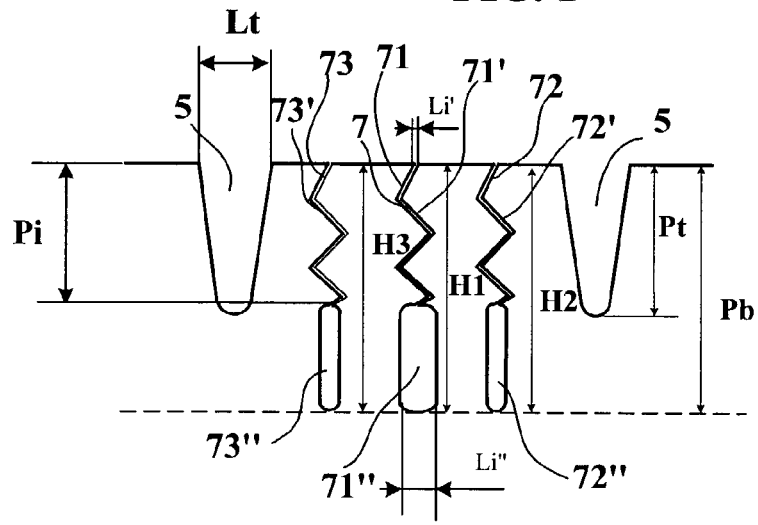
FIG. 2: view in section along II—II of the tread shown in FIG. 1.

As can be seen in FIG. 2, which shows a section along II—II made within the thickness of a block 3 of the tread shown in FIG. 1, the cutout 71 dividing each block 3 of the central rows into two parts is formed of a first incision 71' of average width Li' substantially equal to 0.4 mm and extended from a depth equal to 14 mm by a hollowed zone 71". This hollowed zone 71" is in the form of a channel of width Li" equal to 4 mm opening into the longitudinal grooves 4 defining the block 3, said channel extending over a depth equal to 16 mm.

Each of the cutouts 72, 73 provided on either side of the cutout 71 is formed by a blind incision, that is to say one which does not open into the longitudinal grooves 4, respectively 72', 73', of average width substantially equal to 0.4 mm and extended from a depth equal to 14 mm by a hollowed zone, respectively 72" and 73". These hollowed zones, of width equal to 2 mm are also blind since they do not open into the longitudinal grooves 4 defining the block 3. The dimensions of the hollowed parts 71", 72", 73" are determined so as to have, after wear of the tread greater than or equal to the depth of the transverse grooves 5 formed on the tread when new, a total hollow volume which is substantially identical to or even greater than the hollow volume corresponding to said transverse grooves 5.

To reduce as much as possible the effect of the presence of the cutouts on the rigidity of each block 3, the walls defining the parts of the cutouts forming incisions 71', 72', 73' comprise a plurality of motifs in relief and hollowed motifs, the reliefs of one wall being intended to cooperate with the hollows of the opposite wall.

It is of course possible to produce cutouts 71, 72, 73 having different total depths which may furthermore be greater than the depth Pb; likewise, these cutouts may have incisions of different depths and/or widths.

Figure 3:
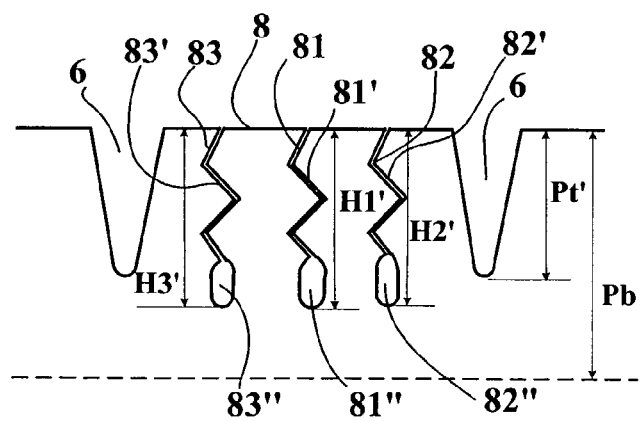
FIG. 3: view in section along III—III of the tread shown in FIG. 1.

As far as the two rows located laterally to the edge of the tread are concerned, FIG. 3 shows a section along III—III in the thickness of a block 2 of an edge of the tread shown in FIG. 1. Each block of rubber 2 is defined longitudinally by grooves of transverse main orientation 6 of average width equal to 8 mm at the surface of the tread when new and being reduced gradually to 4 mm towards the bottom of said grooves; the depth Pt' of the transverse grooves 6 is equal to 16 mm. The average distance between two successive transverse grooves 6 is equal to 52 mm.

Each of the blocks 2 of the two edge rows comprises three cutouts 81, 82, 83 opening on to the running surface when new. A first cutout 81 divides each block 2 into two substantially equal parts and opens both on to the running surface 8, into a longitudinal groove 4 adjoining said block 2 and axially towards the outside of the tread. On either side of this first cutout 81, there are provided two other cutouts 82, 83 opening solely onto the running surface 8 when new and not into the longitudinal groove 4 or axially to the outside of the tread. The total depth of each of these cutouts in the present case is equal to 21 mm.

As can be seen in FIG. 3, the first cutout 81, of total depth H1' equal to 21 mm, divides each block 2 of the edge rows into two parts and is formed of a first incision 81' of average width substantially equal to 0.4 mm and extended from a depth equal to 13 mm by a hollowed zone 81". This hollowed zone 81" is formed by a channel of width equal to 3 mm opening into a longitudinal groove defining the block and towards the outside of the tread and extending over a depth equal to 8 mm.

The cutouts 82, 83, of depth respectively H2', H3' both equal to H1', made on either side of this first cutout 81 are formed by a incision which does not open out laterally, respectively 82', 83', of average width substantially equal to 0.4mm extended from a depth equal to 13 mm by a hollowed zone respectively 82", 83". These hollowed zones, of width equal to 3 mm, are also obstructed since they do not open out laterally to the outside of the block 2. The dimensions of the hollowed parts 81", 82", 83" are selected (for each block of the rows of the edges of the tread) so as to have, after wear of the head greater than or equal to the depth Pt (in the present case Pt=16 mm) of the transverse grooves 6 present when new, a hollow volume, on each row of the edge of the tread, substantially identical or even greater than the hollow volume corresponding to said transverse grooves 6 when new.

Comparative tests were carried out on tires of dimension 315/80 R 22.5 of the same internal structure and differing solely by their treads. The tire serving as a control (the results of which are taken for the base 100) corresponds to the tire sold under the trade mark XDN whereas the tire according to the invention is provided with a tread corresponding to the tread described further above with the support of FIGS. 1 to 3.

Travelling conditions:

pressure 7.5 bar, load of 3000 kg, average speed of 70 km/h, tire fitted on the four positions of a driving axle of a heavy vehicle.

| Test | Control XDN | Invention |
|---|---|---|
| Wear | 100 | 160 |
|  | (99,531 km) | (166,882 km) |
| Grip new | 100 | 100 |
| Grip wear 10 mm | 100 | 117 |
| Grip wear 17 mm | 100 | 122 |

In the wear test carried out on a track, the average weight loss after a given mileage is measured: for an identical loss of weight it will be noted that the tire according to the invention made it possible to achieve a mileage greater than 1.5 times the mileage of the reference tire chosen.

In the grip test, the performance on a track covered with water (2 mm) was measured by measuring the braking distance.

In addition to the improvement in performance noted for regular wear, irregular wear and maintaining or even improving the grip performance on wet ground, the tread pattern according to the invention makes it possible to achieve operating temperatures in the rubber of the tread which are less by several degrees centigrade than those of the control tire.

Figure 4:
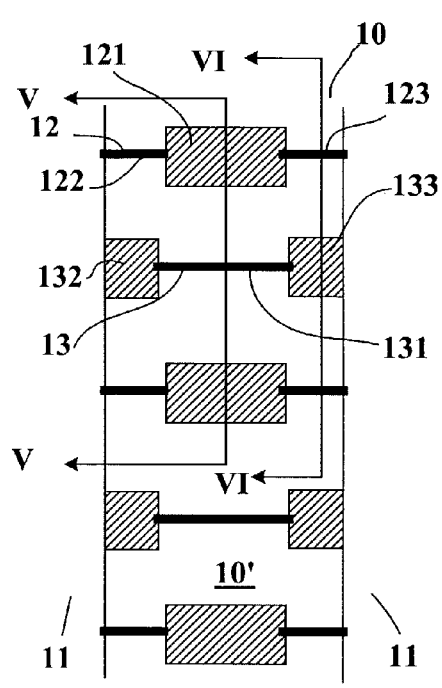
FIG. 4: partial plan view of a tread in accordance with a second variant.

In a second variant, a tread according to the invention comprises a plurality of longitudinal ribs defined by longitudinally oriented grooves. FIG. 4 shows a plan partial view of the contact surface 10' (intended to come into contact with the roadway) of a rib 10 defined by two longitudinal grooves 11, this rib being provided with a plurality of cutouts 12, 13 oriented transversely and regularly spaced in the longitudinal direction.

All the cutouts 12, 13 formed on this rib 10 open on to the contact surface 10' of the rib with the roadway and laterally on to the edges of the rib in the longitudinal grooves 11.

A first series of cutouts comprises a plurality of cutouts 12 having, starting from the running surface of the rib 10, a median part 121 of a width Lt equal to 8 mm and of a depth Pt equal to 12 mm to form a hollowed zone, this median part 121 being extended laterally by parts 122, 123 of a width Li equal to 0.4 mm each forming an incision. Inserted at regular intervals relative to this first series, a second series of cutouts comprises a plurality of cutouts 13 comprising two parts 132, 133 of the same width 8 mm and of depth Pt' equal to 12 mm to form hollowed zones, the latter surrounding a median part 131 forming an incision of width 0.4 mm.

Figure 5:
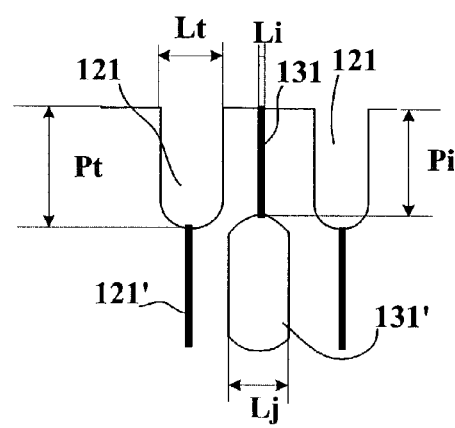
FIG. 5: view in section along V—V of the second tread variant.
Figure 6:
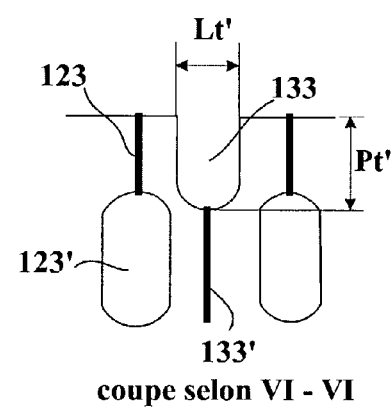
FIG. 6: view in section along VI—VI of the second tread variant.

The cutouts 12, 13 formed in the rib 10 have in the transverse direction of the rib and in the thickness of this rib alternating hollowed zones and incisions as can be seen in FIGS. 5 and 6, which show respectively sections along V—V and VI—VI through the tread when new (such as shown in FIG. 4).

For convenience, only a single alternation in the thickness of the tread has been shown, but it is easy for the person skilled in the art to extend such a solution to the case of a plurality of hollowed zones of width greater than 2 mm, combined with a plurality of incisions of width less than 2 mm.

Preferably, the average width of each part of the cutouts forming an incision is less than or equal to 0.6 mm and the average thickness of each part of the cutouts forming a hollowed zone is at least equal to 3 mm.

Figure 7:
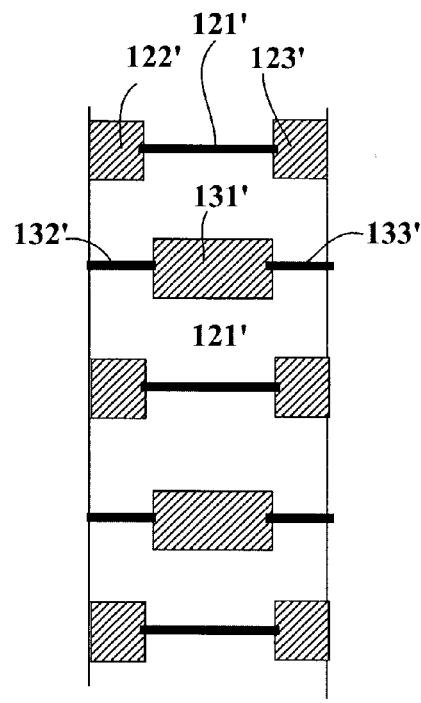
FIG. 7: partial plan view of the tread of the second variant after wear.

After wear of the tread during travel corresponding substantially to a reduction in thickness of the tread equivalent to the depth of 12 mm of the hollowed zones opening on to the running surface when new—as can be seen in FIG. 7—the parts forming incisions 122, 123, 132, 133 of the first and second series of cutouts 12, 13 become widened zones of a depth of 12 mm, whereas the wide parts 121 become narrow zones 121' similar to the first incisions, it being understood that the total volume of the hollowed zones, whatever the level of wear of the tread down to a depth at most equal to 75% of the total thickness of tread to become worn, is still greater than the initial volume of the hollowed zones of the tire when new.

In this manner, the tread according to the invention, when new, has a greater rigidity than the same tread having the same number of cutouts of a width of between 4 and 16 mm and of a depth equal to the thickness of said tread. This is achieved by maintaining a rigidity under force tangent to the surface of the tread in contact, said force being directed circumferentially.

In FIG. 5, it is apparent that the hollowed zones 131' formed beneath the running surface of the tread when new are provided to appear before the hollowed zones 121 opening on to the running surface of the tread when new have disappeared, such that the tread pattern retains throughout its use sufficient hollowed zones to have satisfactory performance during travel on a roadway covered with water for example.

Advantageously, the incisions may be zigzag in at least one direction or have on the walls defining them hollowed motifs and motifs in relief intended to fit into each other so as to effect mechanical locking of said walls in particular in the contact of the tread with the roadway. The cutouts of the tread pattern according to the invention may furthermore have inclinations other than zero with a line perpendicular to the running surface and also average directions at the running surface which are not rectilinear but adopt any suitable geometry.

The variant which has just been described with the support of FIGS. 4 to 7 may be applied to the case of a tread not having a groove of longitudinal orientation: in such a case, the cutouts may or may not adversely affect the entire width of said tread.

Figure 8:
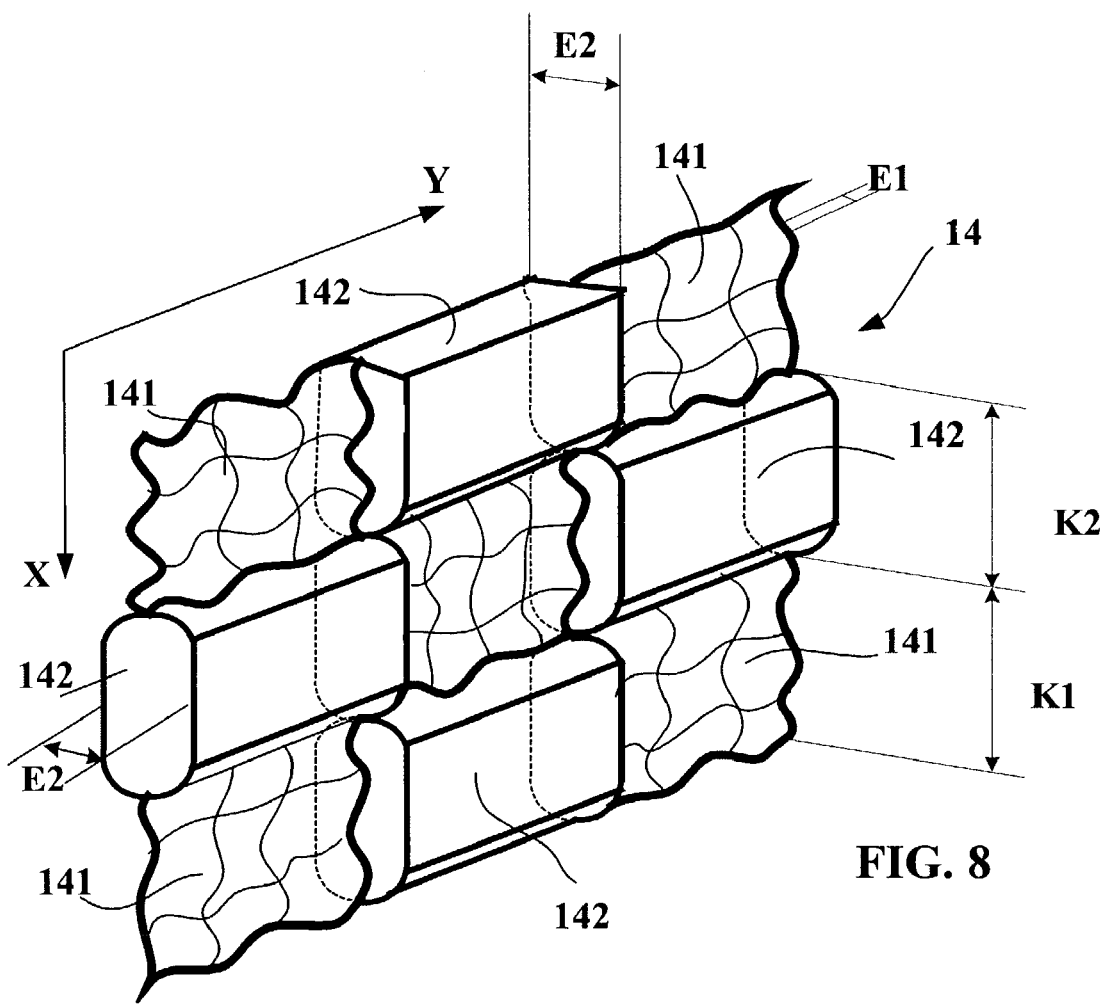
FIG. 8: view of a molding element according to the invention intended to be fitted on a mould molding a tread.

FIG. 8 shows in part a molding element 14 intended to be fitted on a mould molding a tread according to the invention. This molding element 14 is constructed around an average plane, the thickness of the molding element being perpendicular to this average plane; the molding element comprises a first region (not shown in the figure) intended to be anchored in a mould and a second region (shown in FIG. 8) intended to protrude from the molding surface of the mould for molding a cutout in a rubber tread. The second region of the molding element comprises a plurality of parts 141, 142 of different average thicknesses, these parts being distributed alternately in two directions lying in the average plane of said element and perpendicular to each other (these directions are marked X and Y in FIG. 8).

The plurality of parts of different average thicknesses comprises thin parts 141 of average thickness E1 equal to 0.6 mm thick parts 142 of average thickness E2 equal to 4 mm. At the interface between that part of the molding element which is shown and the part of this molding element which is intended to be anchored in the mould, there is a part of average thickness E2 surrounded by two parts of thickness E1. The parts of average thickness E1 have geometries having numerous undulations both in the direction X and in the direction Y. One part of average thickness E1 equal to 0.6 mm is extended in both directions X and Y by a part of average thickness E2 equal to 4 mm; the respective heights K1 and K2 of each part are substantially identical in the present case. "Height of a region" is understood to mean the length of said region measured in a direction substantially perpendicular to the molding surface of the mould when the element is in place on said mould (in the present case in a direction parallel to the direction X).

Preferably, the ratio between the average thicknesses of the thick parts 142 and of the thin parts 141 is less than 10 in order to facilitate demoulding. Connecting zones of variable thickness may furthermore be provided between the thin parts and the thick parts in order to facilitate demoulding.

The invention claimed is:

1. A tread, an outer surface of which is intended to constitute the running surface of a tire for coming into contact with the roadway during travel of the tire, this tread, having a maximum thickness Pb which can become worn during travel and being provided with a plurality of cutouts of essentially transverse orientation, in at least one rib, each cutout, viewed on the running surface when new, having:

at least one first part of width greater than or equal to 2 mm and of depth Pt of between 30% and 80% of the total depth of said cutout, said part forming a hollowed zone being extended into the thickness of the tread by at least one part of width less than 2 mm forming an incision, at least one second part of width less than 2 mm and of depth of between 30% and 80% of the total depth of said cutout, this second part forming an incision and being in the axial extension of the first part, this second part being extended into the thickness of the tread by at least one part of width greater than or equal to 2 mm to form a new hollowed zone, all the hollowed zones opening on to the running surface constitute a total hollow volume at least equal to 10% of the volume of the tread to become worn, wherein, after homogenous wear equal to or greater than the depth of the first part, the total volume of the hollowed zones opening on to the running surface is between 80% and 150% of the total initial volume of the hollowed zones opening on to the running surface when new and wherein the average width of the parts of the cutouts forming an incision is less than 2 mm and in that the average width of the parts of the cutouts forming hollowed zones is greater than or equal to 2 mm and at most equal to ten times the average width of the parts of the cutouts forming an incision;

wherein at least one of the parts of the cutouts forming incisions is defined by two walls of rubber provided with means for permitting meshing of one wall with the other in order to limit at least certain relative movements between said walls.

2. The tread according to claim 1 wherein an average width of each part of the cutouts forming a incision is less than or equal to 0.6 and in that the average width of each part of the cutouts forming a hollowed zone is at least equal to 3 mm.

3. A tire provided with a tread according to claim 1, said tire adapted to be fitted on a driving axle of a heavy vehicle.

4. The tread according to claim 1 wherein the means for meshing the opposite walls comprise undulations in the walls.

5. The tread according to claim 4 wherein the undulations include undulations distributed generally in the radial direction of the tire and undulations distributed in a direction transversely of the radial direction.

6. The tread according to claim 1 wherein the means for meshing the opposite walls comprises a roughness of the walls.

* * * * *